(12) United States Patent
Maji

(10) Patent No.: US 11,086,134 B2
(45) Date of Patent: Aug. 10, 2021

(54) BEAM SPLITTER ASSEMBLY

(71) Applicant: Shimadzu Corporation, Kyoto (JP)

(72) Inventor: Takeshi Maji, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 151 days.

(21) Appl. No.: 16/487,261

(22) PCT Filed: May 1, 2017

(86) PCT No.: PCT/JP2017/017122
§ 371 (c)(1),
(2) Date: Aug. 20, 2019

(87) PCT Pub. No.: WO2018/203363
PCT Pub. Date: Nov. 8, 2018

(65) Prior Publication Data
US 2020/0159033 A1     May 21, 2020

(51) Int. Cl.
*G02B 27/14* (2006.01)
*G02B 27/10* (2006.01)
*G02B 7/18* (2021.01)
*G02B 7/198* (2021.01)

(52) U.S. Cl.
CPC .............. *G02B 27/10* (2013.01); *G02B 7/181* (2013.01); *G02B 7/198* (2013.01)

(58) Field of Classification Search
CPC ........ G02B 27/10; G02B 7/181; G02B 7/198; G02B 7/182

USPC ........................................................ 359/629
See application file for complete search history.

(56) References Cited

U.S. PATENT DOCUMENTS

2003/0231287 A1* 12/2003 Maki .................... H04N 9/3105
                                                              353/119

FOREIGN PATENT DOCUMENTS

JP          3174573 U      3/2012

OTHER PUBLICATIONS

Written Opinion by the International Search Authority for application PCT/JP2017/017122, submitted with a machine translation.

* cited by examiner

*Primary Examiner* — James C. Jones
(74) *Attorney, Agent, or Firm* — Muir Patent Law, PLLC

(57) ABSTRACT

In a beam splitter assembly 7, a beam splitter 22 is supported at three points by three bent portions 41 of a first spacer 24. Therefore, the beam splitter 22 can be prevented from being affected by the surface accuracy of a holder 21. Further, in the beam splitter assembly 7, the first spacer 24 faces the peripheral edge portion of the beam splitter 22. Each bent portion 41 is configured by bending each outer projection piece. Therefore, the external shape of the first spacer 24 can be prevented from becoming larger than the external shape of the beam splitter 22. And it is possible to suppress that the size of the holder 21 for providing the first spacer 24 becomes large. As a result, the miniaturization of the beam splitter assembly 7 can be realized.

6 Claims, 9 Drawing Sheets

BEAM SPLITTER ASSEMBLY

TECHNICAL FIELD

The present invention relates to a beam splitter assembly provided with a beam splitter and a holder for holding the beam splitter.

BACKGROUND ART

Conventionally, a beam splitter has been used in a spectrophotometer, such as, e.g., an FT-IR (Fourier transform infrared spectrophotometer). In an FT-IR, light emitted from a light source is reflected by a fixed mirror and a movable mirror via a beam splitter. Then, the light reflected by the fixed mirror and the light reflected by the movable mirror interfere with each other, and the interfered light is irradiated toward a sample (for example, see Patent Document 1 below). Such a beam splitter is fixed at a fixed position by being held by normally a holder or the like.

FIG. 7 is a perspective diagram showing a configuration of a conventional beam splitter assembly 100. FIG. 8 is an exploded perspective diagram of the beam splitter assembly 100. The beam splitter assembly 100 is an integral unit including a beam splitter 101 and a holder 102, and is used for an FT-IR and the like. The beam splitter assembly 100 is provided with a beam splitter 101, a holder 102, a spacer 103, a compensating plate 104, and a pair of fixing plates 105.

The beam splitter 101 is formed in a disk shape. The holder 102 is formed in a flat plate shape having a predetermined thickness (a thickness larger than the thickness of the beam splitter 101). An opening 102a is formed at the center portion of the holder 102. A flange 102b is provided on the inner peripheral surface (inner peripheral surface of the portion where the opening 102a is formed) in the holder 102. The spacer 103 is provided with a ring portion 103a formed in an annular shape and three projection pieces 103b projecting radially inward from the inner edge portion of the ring portion 103a. The compensating plate 104 is formed in a disk shape. Each fixing plate 105 is formed in an annular shape.

When assembling the beam splitter assembly 100, the beam splitter 101 is inwardly inserted in the opening 102a of the holder 102 from one side (left side in FIG. 8) of the opening 102a, and the compensating plate 104 is inwardly inserted in the opening 102a of the holder 102 from the other side (right side in FIG. 8) of the opening 102a. At this time, the spacer 103 is arranged between the flange 102b and the beam splitter 101. In this state, a pair of fixing plates 105 are fixed to both sides of the holder 102 (both sides in the left-right direction in FIG. 8), so that each of the beam splitter 101 and the compensating plate 104 is pressed by the pair of fixing plates 105 and fixed to the holder 102.

In general, a beam splitter is required to have a surface accuracy of 1/10 or less of the used wavelength so that the wave-front of the reflected light is not disturbed. Therefore, the beam splitter 101 is processed with high accuracy. On the other hand, the holder 102 is processed by a low cost method such as cutting. Therefore, if the beam splitter 101 is directly fixed (pressed) to the holder 102, the beam splitter 101 is deformed by the influence of the machining accuracy of the flange 102b, causing deterioration of the surface accuracy thereof.

From such a point, in the beam splitter assembly 100, as described above, the spacer 103 is interposed between the flange 102b and the beam splitter 101. Therefore, even when the machining accuracy of the holder 102 is low, the beam splitter 101 can be fixed to the holder 102 without being deformed. FIG. 9 is a view schematically showing the arrangement relation between the beam splitter 101 and the spacer 103 when viewed in the thickness direction of the beam splitter 101.

The beam splitter 101 is in contact with three projection pieces 103b of the spacer 103 in a state of being fixed to the holder 102. That is, the beam splitter 101 is fixed in a state of being supported at three points. As described above, by supporting the beam splitter 101 at three points, the beam splitter 101 can be prevented from being deformed by the influence of the surface accuracy of the holder 102 (flange 102b), and the beam splitter 101 can be kept in a stable state.

PRIOR ART DOCUMENT

Patent Document

Patent Document 1: Utility Model Registration No. 3174573

SUMMARY OF THE INVENTION

Problems to be Solved by the Invention

However, the beam splitter assembly 100 described above has a problem that the size of the spacer 103 is increased, which in turn increases the overall size.

Specifically, since it is configured such that the spacer 103 supports the beam splitter 101 by the projection pieces 103b, the configuration becomes such that the outer edge of the beam splitter 101 and the projection piece 103b overlap when viewed in the thickness direction. Further, in the spacer 103, the projection piece 103b protrudes radially inward from the ring portion 103a. Therefore, the outer shape of the spacer 103 (ring portion 103a) becomes larger than the outer shape of the beam splitter 101. And in the holder 102, the space for arranging the spacer 103 with a large outside diameter is needed, which increases the size.

The present invention has been made in view of the aforementioned circumstances, and an object of the present invention is to provide a beam splitter assembly capable of making a beam splitter not affected by surface accuracy of a holder and realizing miniaturization.

Means for Solving the Problems (1) The beam splitter assembly according to the present invention is provided with a beam splitter, a holder, and a first spacer. The holder holds the beam splitter. The first spacer is arranged between the beam splitter and the holder. The first spacer faces the peripheral edge portion of the beam splitter, and supports the beam splitter at three points by three bent portions each configured by folding a part of the first spacer.

According to such a configuration, in the beam splitter assembly, the beam splitter is supported at three points by three bent portions of the first spacer. Therefore, the beam splitter can be prevented from being affected by the surface accuracy of the holder. Further, the first spacer faces the peripheral edge portion of the beam splitter. Each bent portion is configured by bending a part of the first spacer.

Therefore, the external shape of the first spacer can be prevented from becoming larger than the external shape of the beam splitter. And it is possible to suppress that the size of the holder for providing the first spacer becomes large. As a result, the miniaturization of the beam splitter assembly can be realized.

(2) Further, in the first spacer, a first folding assisting line indicating a bending position where a part of the first spacer is folded may be formed so as to correspond to each of the three bent portions.

According to such a configuration, each bent portion can be configured by folding a part of the first spacer along the first folding assisting line. Therefore, in the first spacer, each bent portion can be easily and accurately configured.

(3) The first spacer may have an annular first main body facing the peripheral edge portion of the beam splitter. In the first spacer, the three bent portions may be formed at equal intervals in a circumferential direction with respect to a center of the first main body.

According to such a configuration, three bent portions of the first spacer can support the beam splitter in a well-balanced manner. Therefore, the beam splitter can be kept in a more stable manner.

(4) Further, the beam splitter assembly may further include a compensating plate and a second spacer. The compensating plate is held by the holder. The second spacer is arranged between the compensating plate and the holder. The second spacer faces the peripheral edge portion of the compensating plate, and the compensating plate is supported at an angle with respect to an optical axis by at least one bent portion configured by folding a part of the second spacer.

According to such a configuration, the second spacer faces the peripheral edge portion of the beam splitter. And, at least one bent portion is configured by bending a part of the second spacer.

Therefore, the external shape of the second spacer can be prevented from becoming larger than the external shape of the beam splitter. And it is possible to suppress that the size of the holder for providing the second spacer becomes large. Further, the second spacer can be formed into a shape that can be easily set in the holder. Therefore, the workability when setting the second spacer to the holder can be improved.

(5) Further, in the second spacer, a second folding assisting line indicating a bending position where a part of the second spacer is folded may be formed so as to correspond to the at least one bent portion.

According to such a configuration, the bent portion can be configured by bending a part of the second spacer along the second folding assisting line. Therefore, in the second spacer, the bent portion can be easily and accurately configured.

(6) Further, the second spacer may include an annular second main body facing a peripheral edge portion of the compensating plate. In the second spacer, the at least one bent portion may be formed in a circumferential direction with respect to a center of the second body.

According to such a configuration, in the second spacer, the bent portion can be arranged at an appropriate position.

Effects of the Invention

According to the present invention, the beam splitter is supported at three points by three bent portions of the first spacer. Therefore, the beam splitter can be prevented from being affected by the surface accuracy of the holder by the the three bent portion of the first spacer. Further, the first spacer faces the peripheral edge portion of the beam splitter. Therefore, the external shape of the first spacer can be prevented from becoming larger than the external shape of thy: beam splitter. As a result, the miniaturization of the beam splitter assembly can be realized.

EMBODIMENTS FOR CARRYING OUT THE INVENTION

1. Configuration of Fourier Transform Infrared Spectrophotometer

Figure 1:
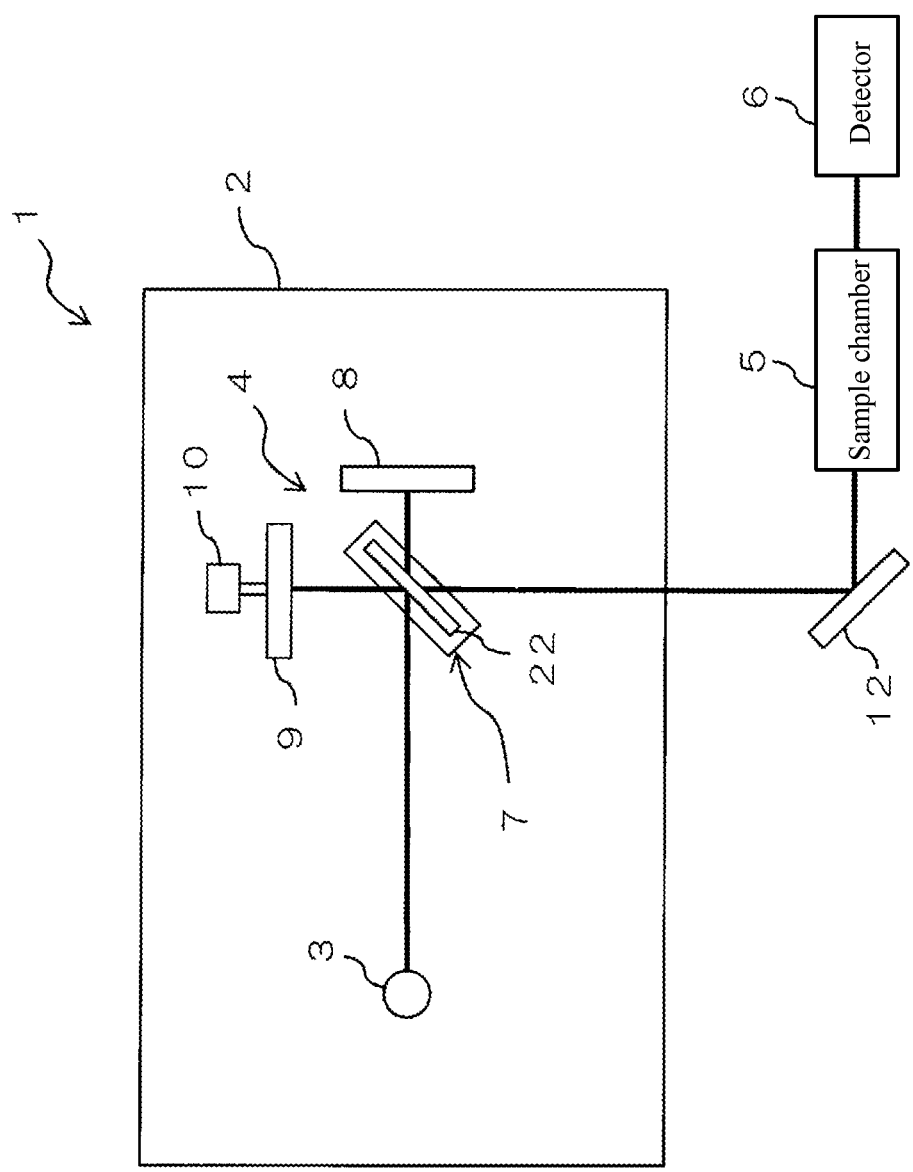
FIG. 1 is a schematic diagram showing a configuration of an analysis device provided with a beam splitter assembly according to an embodiment of the present invention.

FIG. 1 is a schematic diagram showing a configuration of an analysis device 1 provided with a beam splitter assembly 7 according to an embodiment of the present invention. The analysis device 1 is a Fourier transform infrared spectrophotometer (FT-IR), and is provided with a housing 2, a heater 3, an interference unit 4, a sample chamber 5, and a detector 6. The housing 2 is formed in a hollow box shape. The heater 3 is housed (arranged) in the housing 2. The heater 3 is composed of, for example, a ceramic heater, and is configured to emit infrared light (measurement light) by being energized.

The interference unit 4 is arranged in the housing 2. The interference unit 4 is a mechanism for generating infrared interference light, and is arranged on the downstream side of the heater 3 in the optical path. The interference unit 4 is provided with a beam splitter assembly 7, a fixed mirror 8, a movable mirror 9, and a drive unit 10.

The beam splitter assembly 7 is arranged so as to be spaced apart from the heater 3. The beam splitter assembly 7 is provided with a beam splitter 22. The beam splitter 22 is configured to reflect a part of incident light and transmit the rest of the incident light. The detailed configuration of the beam splitter assembly 7 will be described later. The fixed mirror 8 is arranged on the opposite side of the heater 3 across the beam splitter assembly 7. The fixed mirror 8 is arranged so as to be fixed at a fixed position.

The movable mirror 9 is arranged so as to be spaced apart from the beam splitter assembly 7 and the fixed mirror 8. The movable mirror 9 is configured to be movable in a direction connecting the beam splitter assembly 7 and the movable mirror 9. The drive unit 10 is composed of, for example, a voice coil motor or the like, and is configured to give a driving force to the movable mirror 9. A passing window (not shown) for light to pass through is formed in a portion of the housing 2 facing the interference unit 4.

The sample chamber 5 is arranged so as to be spaced apart from the housing 2. The sample chamber 5 is formed in a hollow box shape, and accommodates a sample (not shown) therein. In the optical path, a reflection mirror 12 is arranged on the upstream side of the sample chamber 5. A detector 6 is arranged so as to be spaced apart from the sample chamber 5. The detector 6 is composed of, for example, an MCT (Hgcdte) detector, a DLaTGS (Deuterated L-Alanine Triglycine Sulfate) detector, a TGS (Triglycine Sulphate) detector, a DTGS (Deuterated Hydrogen TGS: Deuterium Tri-Glycine Sulfate) detector, etc.

In an analysis of a sample in the analysis device 1, infrared light is emitted from the heater 3. Then, the infrared light is incident on the beam splitter 22. The infrared light incident on the beam splitter 22 partially transmits the beam splitter 22 and is incident on the fixed mirror 8, and the rest thereof is reflected by the beam splitter 22 and incident on the movable mirror 9. At this time, the movable mirror 9 is moved by being given a driving force from the drive unit 10.

The infrared light reflected by the fixed mirror 8 is reflected by the beam splitter 22 toward the reflection mirror 12. Further, the infrared light reflected by the movable mirror 9 passes through the beam splitter 22 toward the reflection mirror 12. As a result, the infrared light reflected by the fixed mirror 8 and the infrared light reflected by the movable mirror 9 are synthesized into infrared interference light, and emitted outside the housing 2 toward the reflection mirror 12. Then, the synthesized infrared light is reflected by the reflection mirror 12 and incident on the sample chamber 5. The infrared light incident on the sample chamber 5 is irradiated on the sample in the sample chamber 5. Then, the reflected light or the transmitted light from the sample is emitted from the sample chamber 5 and is incident on the detector 6.

The detector 6 outputs an interferogram corresponding to the incident infrared light as a detection signal. In the analysis device 1, intensity distribution data of a spectrum is created by subjecting the detection signal from the detector 6 to Fourier transform. The sample is then analyzed based on the data.

2. Configuration of Beam Splitter Assembly

Figure 2:
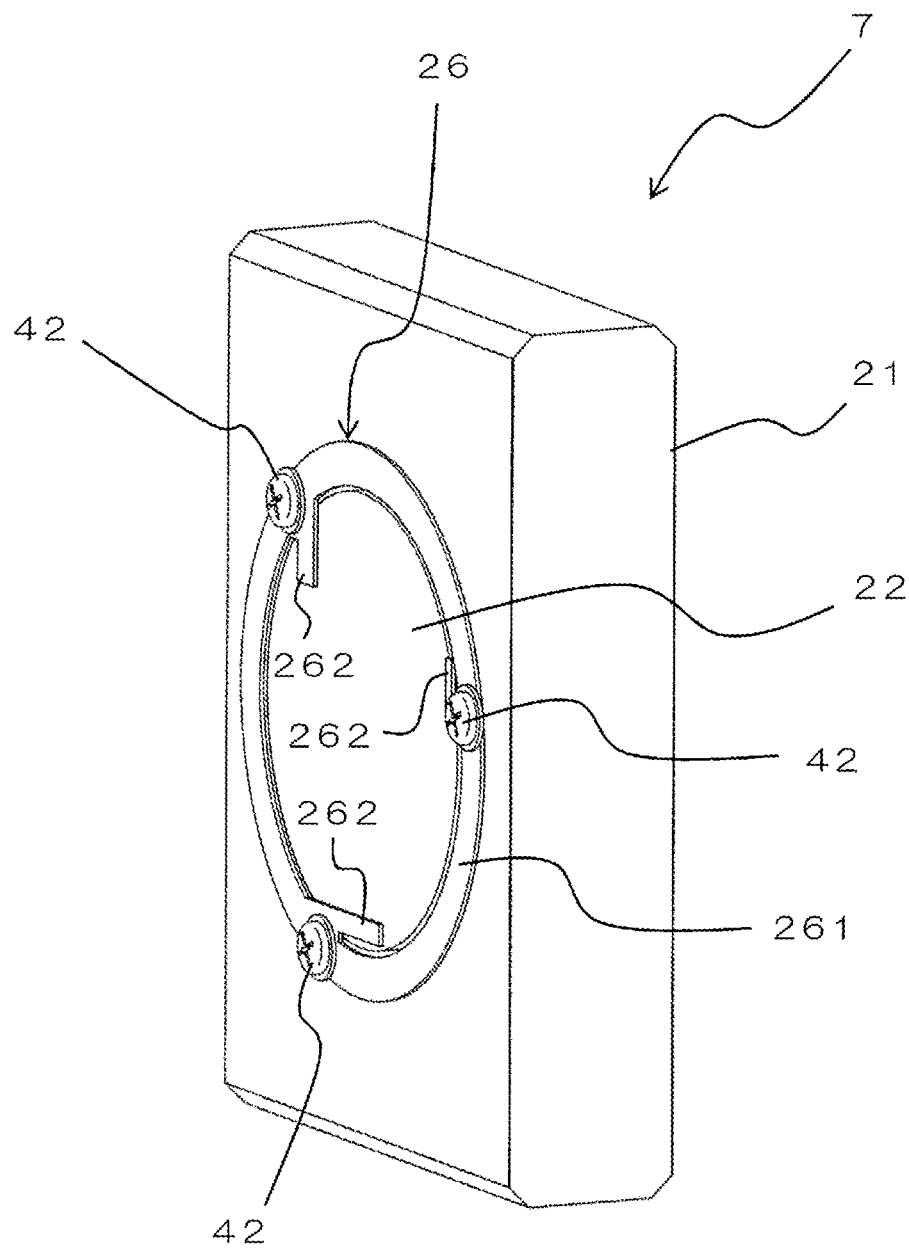
FIG. 2 is a perspective diagram showing a configuration of the beam splitter assembly of FIG. 1.
Figure 3:
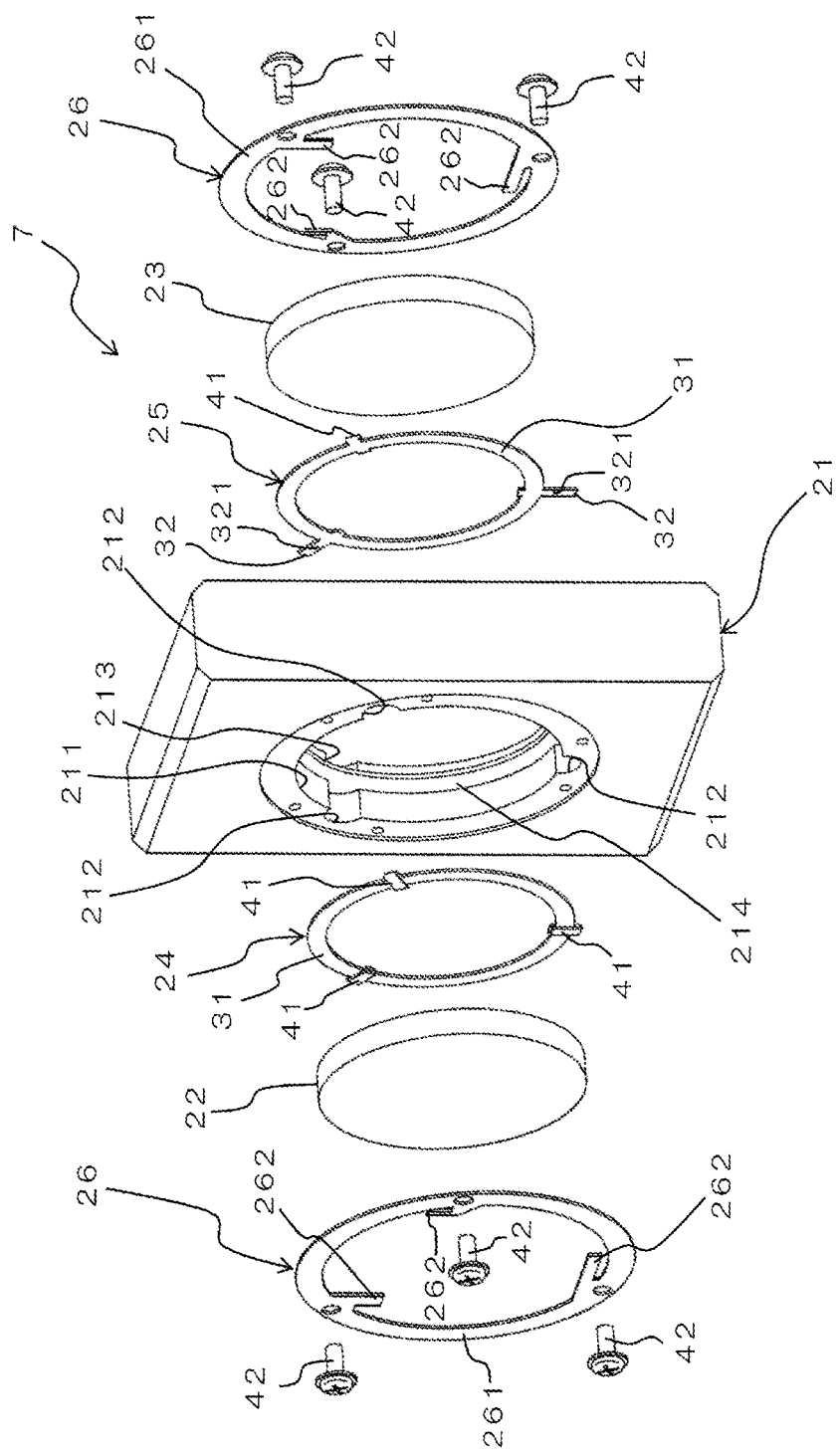
FIG. 3 is an exploded perspective diagram showing the beam splitter assembly of FIG. 1.

FIG. 2 is a perspective view showing the configuration of the beam splitter assembly 7. FIG. 3 is an exploded perspective view of the beam splitter assembly 7.

The beam splitter assembly 7 is provided with a holder 21, a beam splitter 22, a compensating plate 23, a first spacer 24, a second spacer 25, and a pair of fixing plates 26.

The holder 21 is formed in a flat plate shape having a predetermined thickness. In the holder 21, an opening 211, three first recesses 212, and three second recesses 213 are formed. Further, the holder 21 is provided with a flange 214. The opening 211 has a circular shape when viewed in the thickness direction (left-right direction in FIG. 3), and penetrates the center portion of the holder 21 in the thickness direction.

The flange 214 is provided on the inner peripheral surface (inner peripheral surface of the portion where the opening 211 of the holder 21 is formed) of the holder 21. The flange 214 has an annular shape when viewed in the thickness direction, and protrudes radially inward of the opening 211 from the center portion of the inner peripheral surface of the holder 21.

Each first recess 212 is formed on the inner peripheral surface on one side in the thickness direction (left side in FIG. 3) of the inner peripheral surface of the holder 21. Each first recess 212 is recessed radially outward from the inner peripheral surface of the holder. The three first recesses 212 are provided at equal intervals (at 120 degree intervals) in the circumferential direction with respect to the center of the opening 211.

Each second recess 213 is formed on the inner peripheral surface on the other side in the thickness direction (right side in FIG. 3) of the inner peripheral surface of the holder 21. Each second recess 213 is recessed radially outward from the inner peripheral surface of the holder. The three second recesses 213 are provided at equal intervals (at 120 degree intervals) in the circumferential direction with respect to the center of the opening 211. In the thickness direction, the three second recesses 213 are formed at the same positions as the three first recesses 212. Note that in FIG. 3, only one second recess 213 of the three second recesses 213 is illustrated.

The beam splitter 22 is arranged on one side in the thickness direction (the left side in FIG. 3) with respect to the holder 21. The beam splitter 22 is formed in a disk shape having a predetermined thickness (a thickness thinner than the thickness of the holder 21). The diameter of the beam splitter 22 is slightly smaller than the diameter of the opening 211 of the holder 21.

The compensating plate 23 is arranged on the other side (the right side in FIG. 3) in the thickness direction with respect to the holder 21. The compensating plate 23 is formed in a disk shape having a predetermined thickness (a thickness thinner than the thickness of the holder 21). The diameter of the compensating plate 23 is substantially the same as the diameter of the beam splitter 22.

The first spacer 24 is arranged between the holder 21 and the beam splitter 22. The first spacer 24 is an annular sheet-like member and is arranged between the holder 21 and the beam splitter 22 in a partially folded state when the beam splitter assembly 7 is assembled.

The second spacer 25 is arranged between the holder 21 and the compensating plate 23. The second spacer 25 is an annular sheet-like member, and is arranged between the holder 21 and the compensating plate 23 in a partially bent state when the beam splitter assembly 7 is assembled. Each fixing plate 26 is provided with an annular mounting portion 261 and three fixing pieces 262 projecting inward from the mounting portion 261. In the beam splitter assembly 7 configured as described above, the first spacer 24 and the second spacer 25 are composed of the same member (spacer member 30).

Figure 4:
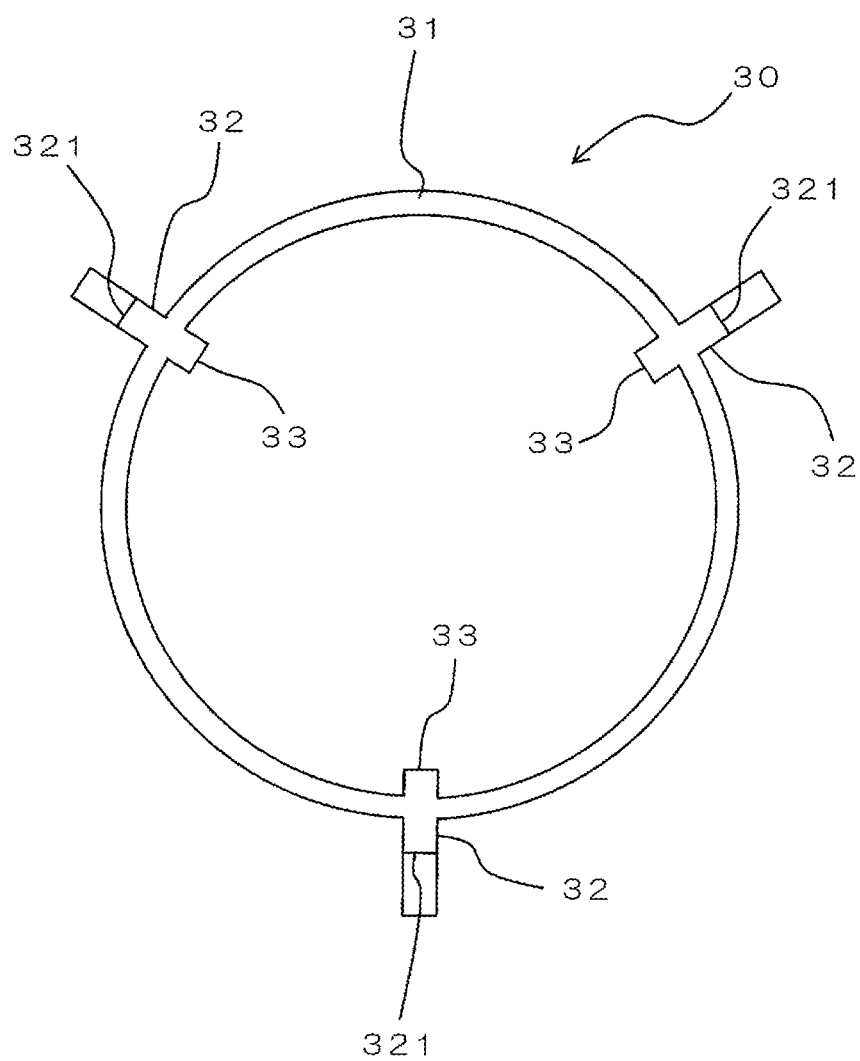
FIG. 4 is a front view showing a spacer member constituting the spacer of FIG. 3.

FIG. 4 is a front view showing the spacer member 30 constituting the first spacer 24 and the second spacer 25. The spacer member 30 is used as the first spacer 24 or the second spacer 25 by bending the part thereof.

The spacer member 30 is a thin annular member and a sheet-like member. The spacer member 30 is made of a resin material, such as, e.g., PET (polyethylene terephthalate). The thickness of the spacer member 30 is sufficiently larger than the flatness of the flange 214. The spacer member 30 is provided with a main body 31, three outer projection pieces 32 and three inner projection pieces 33. The main body 31 is formed in an annular shape. The outer diameter of the main body 31 is slightly smaller than the diameter of the beam splitter 22 and the diameter of the compensating plate 23.

Each outer projection piece 32 protrudes radially outward from the main body 31. Each outer projection piece 32 is formed in a rectangular shape in a front view. The three outer projection pieces 32 are provided at equal intervals (at 120 degree intervals) in the circumferential direction with respect to the center of the main body 31. Each outer projection piece 32 has a folding assisting line 321 formed thereon.

The folding assisting line 321 extends in a direction perpendicular to the projecting direction at the center portion (portion slightly on the main body 31 side from the center portion) of the outer projection piece 32. The folding assisting line 321 is a minute groove slightly recessed in the thickness direction of the outer projection piece 32. As will be described later, the folding assisting line 321 indicates the folding position where the outer projection piece 32 is folded.

Each inner projection piece 33 protrudes radially inward from the main body 31. Each inner projection piece 33 is formed in a rectangular shape in a front view. The three inner projection pieces 33 are provided at equal intervals (at 120 degree intervals) in the circumferential direction with respect to the center of the main body 31. The three inner projection pieces 33 are provided in line with the three outer projection pieces 32 in the radial direction.

Then, the first spacer 24 is configured by bending all three outer projection pieces 32 in the spacer member 30 along the folding assisting lines 321. Further, the second spacer 25 is configured by bending one outer projection piece 32 out of the three outer projection pieces 32 in the spacer member 30 along the folding assisting line 321.

Figure 5:
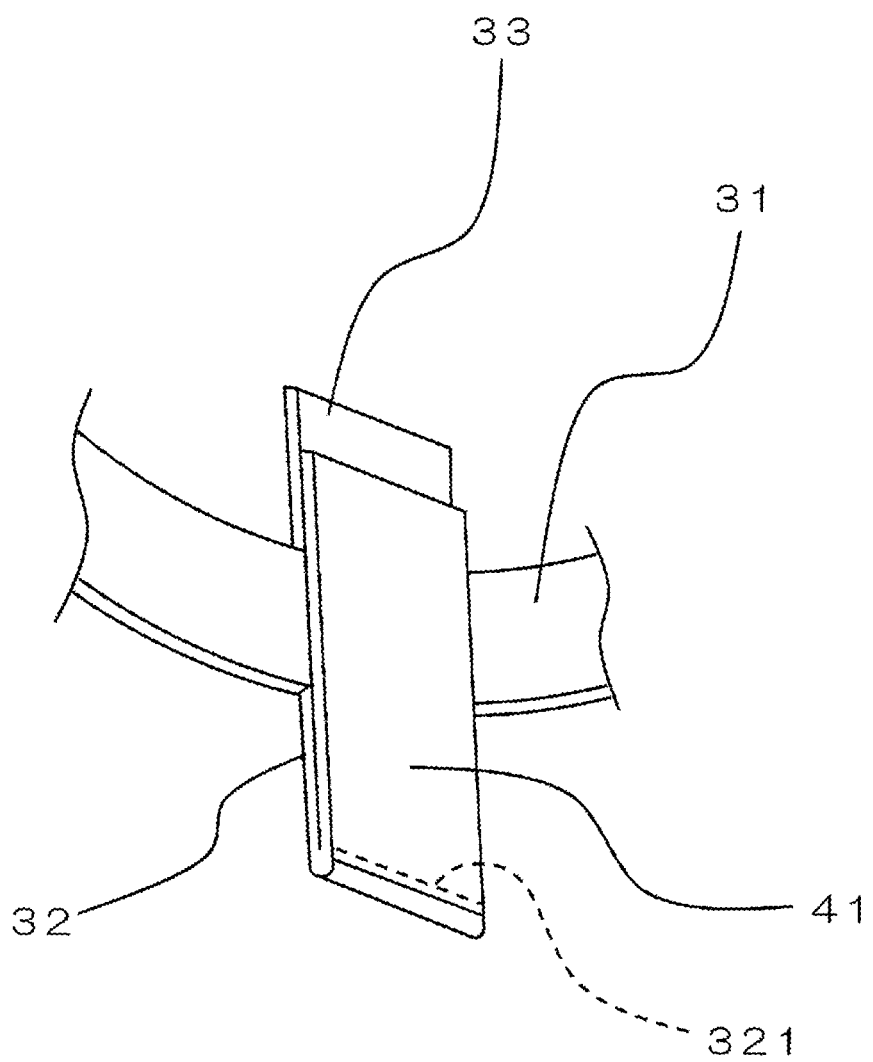
FIG. 5 is an enlarged perspective view showing a state in which the outer projection piece of the spacer member of FIG. 4 is folded.

FIG. 5 is an enlarged perspective view showing the outer projection piece 32 of the spacer member 30 in a folded state. When the outer projection piece 32 of the spacer member 30 is folded along the folding assisting line 321, the portion of the outer projection piece 32 on the tip end side relative to the folding assisting line 321 is folded back and comes into contact with the base end portion (portion on the inner side relative to the folding assisting line 321 of the outer projection piece 32), the main body 31, and the inner projection piece 33. The portion of the outer projection piece 32 on the tip side relative to the folding assisting line 321 is bent to thereby form a bent portion 41.

As shown in FIG. 3, in the first spacer 24, three bent portions 41 are configured. In the first spacer 24, the bent portions 41 are arranged at equal intervals along the circumferential direction of the main body 31. In the first spacer 24, each bent portion 41 is in close contact with (overlaps with) the main body 31. The first spacer 24 is arranged between the beam splitter 22 and the holder 21 such that each bent portion 41 faces the beam splitter 22 (in a direction in which each bent portion 41 faces the beam splitter 22).

In the second spacer 25, one bent portion 41 is configured. In the second spacer 25, the bent portion 41 is arranged at a position along the circumferential direction of the main body 31 and is in close contact with (overlaps) the main body 31. The second spacer 25 is arranged between the compensating plate 23 and the holder 21 such that each bent portion 41 faces the compensating plate 23 (in a direction in which each bent portion 41 faces the compensating plate 23).

In this way, in the beam splitter assembly 7, the first spacer 24 and the second spacer 25 are configured by bending a part (outer projection piece 32) of the same member spacer member 30 in a different pattern. The first spacer 24 is arranged between the beam splitter 22 and the holder 21, and the second spacer 25 is arranged between the compensating plate 23 and the holder 21.

3. Assembly of Beam Splitter Assembly

When assembling the beam splitter assembly 7, the first spacer 24 is inwardly inserted in the opening 211 of the holder 21 from one side (left side in FIG. 8) of the opening 211, and the second spacer 25 is inwardly inserted in the opening 211 of the holder 21 from the other side (right side in FIG. 8) of the opening 211.

Figure 8:
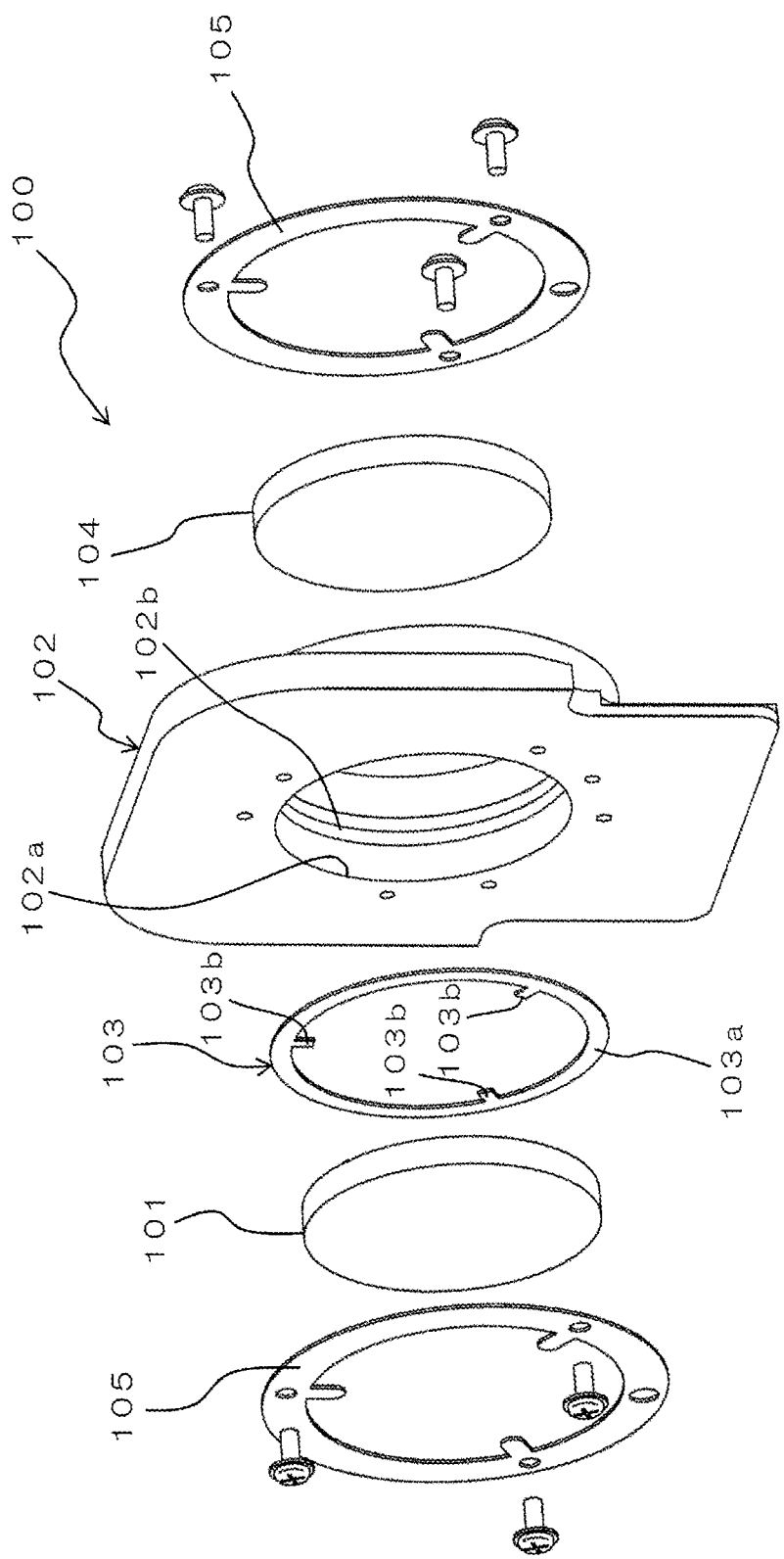
FIG. 8 is an exploded perspective diagram of a conventional beam splitter assembly.
Figure 9:
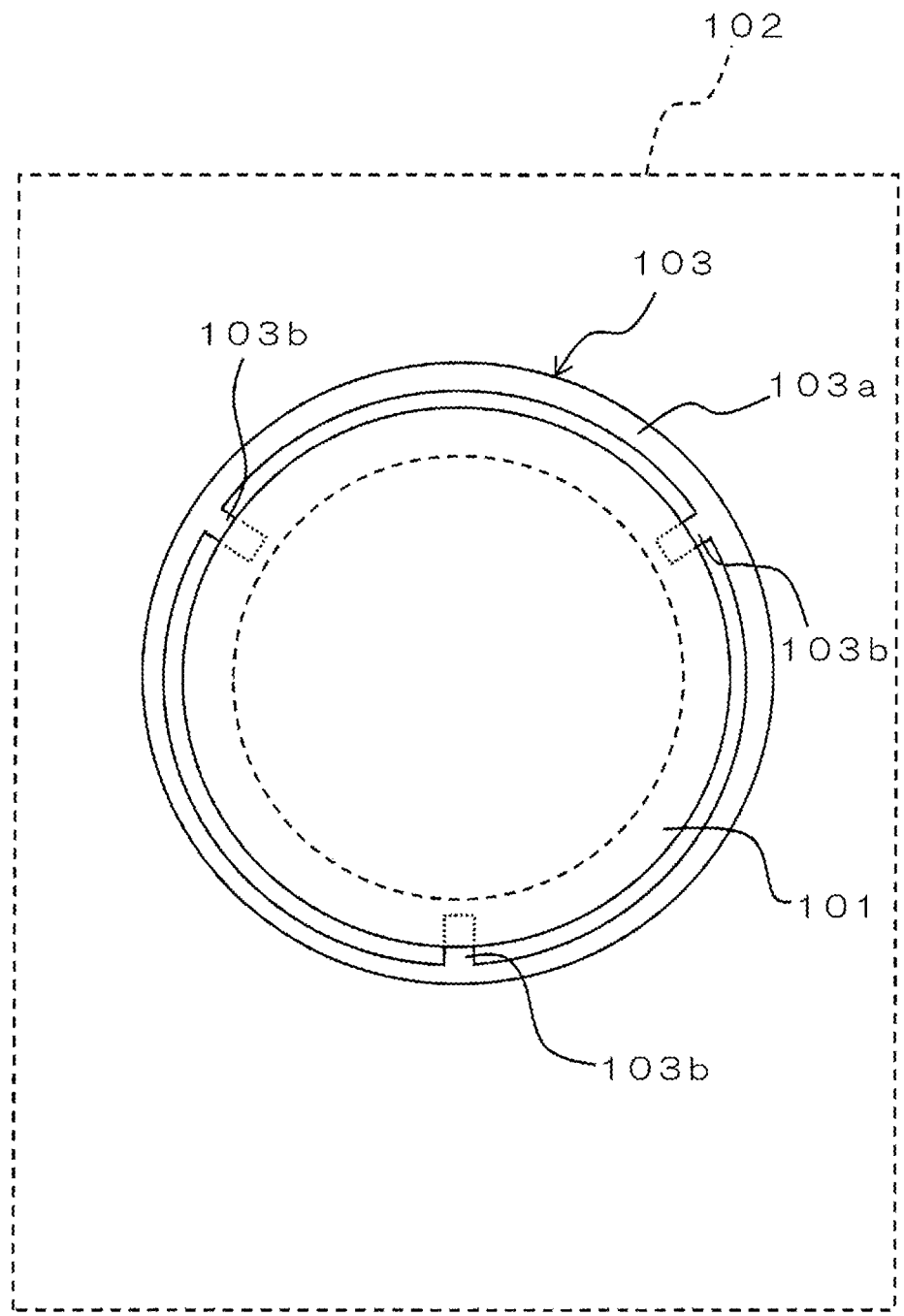
FIG. 9 is a diagram schematically showing an arrangement relation between a beam splitter and a spacer when the beam splitter assembly of FIG. 7 is viewed in a thickness direction.

At this time, each bent portion 41 of the first spacer 24 faces one side of the opening 211 (the left side in FIG. 8). Then, the radially outer end portion of each bent portion 41 of the first spacer 24 is arranged in the first recess 212. The bent portion 41 of the second spacer 25 faces the other side of the opening 211 (right side in FIG. 8). And, the bent portion 41 and the outer projection piece 32 of the second spacer 25 are arranged in the second recess 213.

And from this state, the beam splitter 22 is inserted inwardly from one side (left side in FIG. 3) of the opening 211, and the compensating plate 23 is inserted inwardly from the other side (right side in FIG. 3) of the opening 211.

In this state, a pair of fixing plates 26 are fixed to both sides of the holder 21 (both sides in the left-right direction in FIG. 8 FIG. 3). Specifically, the mounting portion 261 of each fixing plate 26 is fixed to the holder 21 by screws 42. As a result, each of the beam splitter 22 and the compensating plate 23 is pressed by the fixing pieces 262 of the fixing plate 26 and fixed to the holder 21.

In this way, in a state in which the beam splitter assembly 7 is assembled, the first spacer 24 faces the peripheral edge portion of the beam splitter 22, and the second spacer 25 faces the peripheral edge portion of the compensating plate 23. The peripheral edge portion of the beam splitter 22 is in contact with each bent portions 41 of the first spacer 24. With this, the beam splitter 22 is supported by the first spacer 24 at three points. Further, the peripheral edge portion of the compensating plate 23 is in contact with the main body 31 of the second spacer 25, and a part thereof is in contact with the bent portion 41 of the second spacer 25. Therefore, the compensating plate 23 is supported in a state inclined with respect to the plane in the beam splitter 22, that is, in a state inclined with respect to the optical axis.

4. Arrangement Relation Between Beam Splitter and First Spacer

Figure 6:
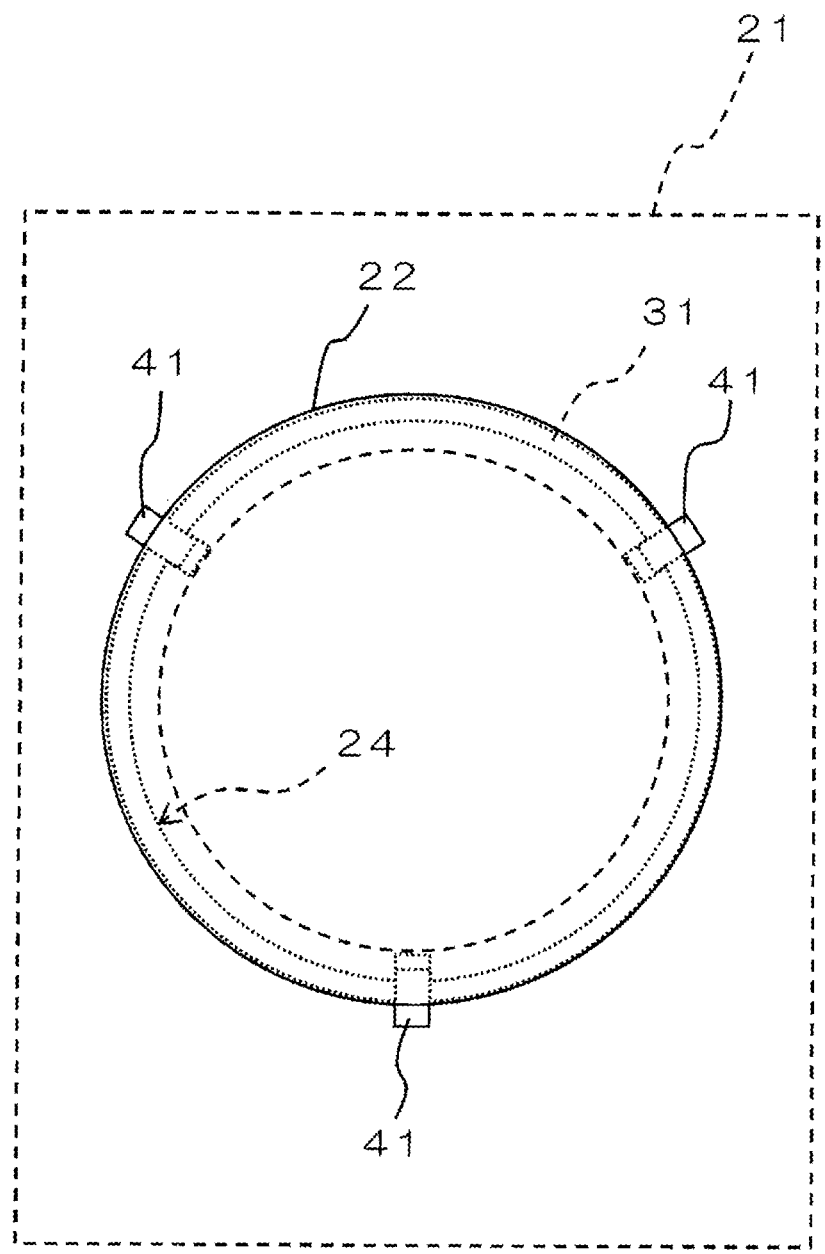
FIG. 6 is a diagram schematically showing an arrangement relation between a beam splitter and a spacer when the beam splitter assembly of FIG. 2 is viewed in a thickness direction.
Figure 7:
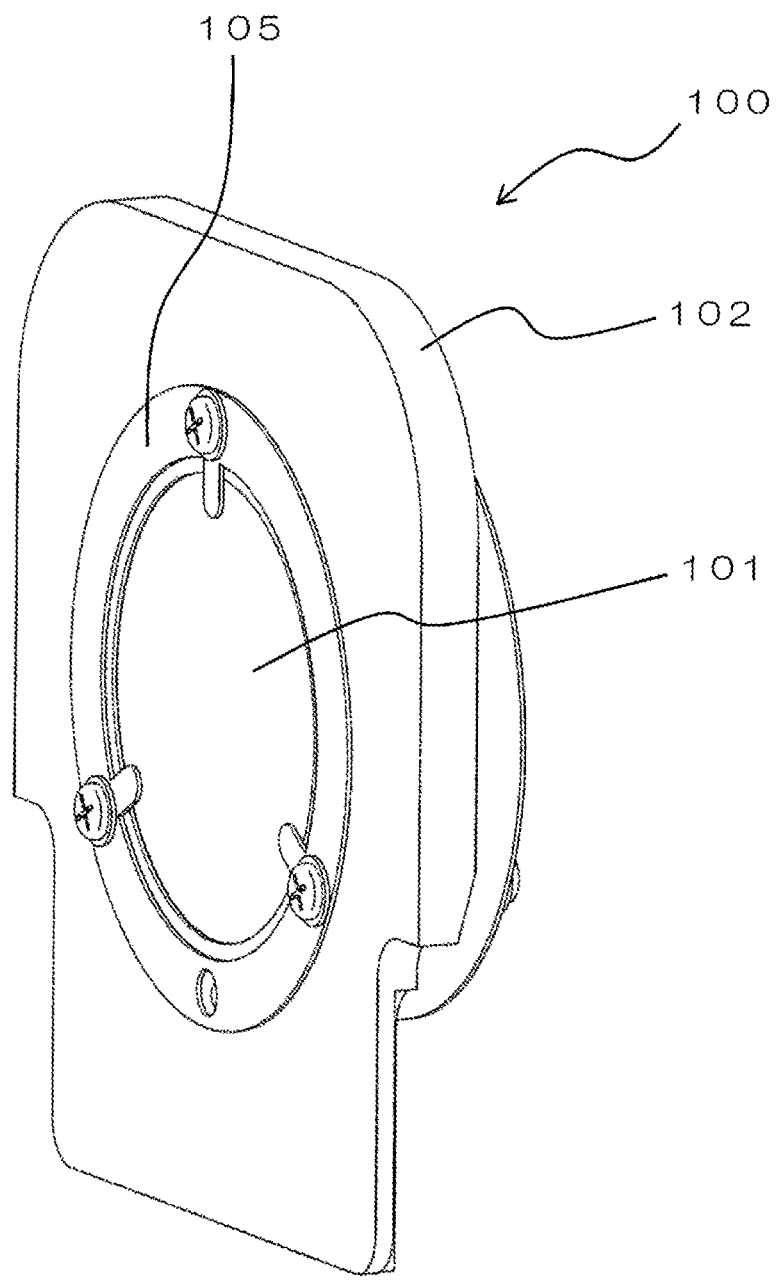
FIG. 7 is a perspective diagram showing a configuration of a conventional beam splitter assembly.

FIG. 6 is a diagram schematically showing the arrangement relation between the beam splitter 22 and the first spacer 24 when the beam splitter assembly 7 is viewed in the thickness direction.

When viewed in the thickness direction, the outer edge of the first spacer 24 is arranged slightly inward with respect to the outer edge of the beam splitter 22. That is, when viewed in the thickness direction, the first spacer 24 is overlaid on the beam splitter 22 (overlapped with the beam splitter 22). Thus, in the beam splitter assembly 7, the outer shape of the first spacer 24 for supporting the beam splitter 22 at three points is smaller.

5. [Functions and Effects]

(1) According to this embodiment, as shown in FIG. 3, in the beam splitter assembly 7, the beam splitter 22 is supported at three points by the three bent portions 41 of the first spacer 24.

Therefore, the beam splitter 22 can be prevented from being affected by the surface accuracy of the holder 21 (it can be suppressed that the beam splitter 22 is deformed due to the effect of the surface accuracy of the holder 21). Further, the first spacer 24 faces the peripheral edge portion of the beam splitter 22. Each bent portion 41 is configured by bending each outer projection piece 32.

Therefore, the external shape of the first spacer 24 can be prevented from becoming larger than the external shape of the beam splitter 22. And it is possible to suppress that the size of the holder 21 for providing the first spacer 24 becomes large. As a result, the miniaturization of the beam splitter assembly 7 can be realized.

(2) Also, according to this embodiment, as shown in FIG. 4, in the first spacer 24 (spacer member 30), the folding assisting line 321 indicating a bending position where the outer projection piece 32 is folded is formed so as to correspond to the bent portion 41.

Therefore, each bent portion 41 of the first spacer 24 is configured by bending each of all three outer projection pieces 32 in the spacer member 30 along the folding assisting line 321. As a result, in the first spacer 24, each bent portion 41 can be easily and accurately configured.

(3) Further, according to this embodiment, as shown in FIG. 3, the first spacer 24 is provided with the annular main body 31 facing the peripheral edge portion of the beam splitter 22. In the first spacer 24, three bent portions 41 are formed at equal intervals (approximately at 120 degree intervals) in the circumferential direction with respect to the center of the main body 31.

Therefore, the beam splitter 22 can be supported in a well-balanced manner by the three bent portions 41 of the first spacer 24. As a result, the beam splitter 22 can be kept in a more stable manner.

(4) Further, according to this embodiment, as shown in FIG. 3, in the beam splitter assembly 7, the second spacer 25 faces the peripheral edge portion of the beam splitter 22. Each bent portion 41 is configured by bending the outer projection piece 32.

Therefore, the external shape of the second spacer 25 can be prevented from becoming larger than the external shape of the beam splitter. It is possible to suppress that the size of the holder 21 for providing the second spacer 25 becomes large.

Further, the second spacer 25 can be formed into a shape that can be easily set in the holder 21. For example, it is possible to set a small filter-like member (filter piece) in the holder 21 to keep the compensating plate 23 in an inclined state. But, in the case of such a member, since the member is small, the work of setting in the holder 21 becomes complicated. Since the second spacer 25 has a size suitable for the work of a worker, the second spacer 25 can be easily set in the holder 21. As described above, since it is configured such that the second spacer 25 supports the compensating plate 23, the workability at the time of setting the second spacer 25 to the holder 21 can be improved.

(5) Further, according to this embodiment, in the second spacer 25 (spacer member 30), the folding assisting line 321 indicating the bending position where the outer projection piece 32 is folded is formed so as to correspond to the bent portion 41.

Therefore, the bent portion 41 of the second spacer 25 can be configured by bending one outer projection pieces 32 in the spacer member 30 along the folding assisting line 321. As a result, in the second spacer 25, the bent portion 41 can be configured simply and accurately.

(6) Further, according to this embodiment, in the second spacer 25, the bent portion 41 is arranged at a position along the circumferential direction of the main body 31, and is in close contact with the main body 31. Therefore, in the second spacer 25, the bent portion 41 can be arranged at an appropriate position.

6. Modification

In the above embodiment, in the first spacer 24, the three bent portions 41 are described as being arranged at equal intervals in the circumferential direction. However, it is also possible to make the intervals of the three bent portions 41 uneven in the first spacer 24.

Also, in the above embodiment, in the second spacer 25, it has been described that only one bent portion 41 is configured. However, in the second spacer 25, two bent portions 41 may be configured along the circumferential direction.

Also, in the above embodiment, the folding assisting line 321 of the spacer member 30 is described as being a minute groove. However, the folding assisting line 321 of the spacer member 30 may be configured by a perforation or may be configured by a mere line.

DESCRIPTION OF REFERENCE SYMBOLS 7 beam splitter assembly
21 holder
22 beam splitter
23 compensating plate
24 first spacer
25 second spacer
30 spacer member
31 main body
32 outer projection piece
41 bent portion
321 folding assisting line

The invention claimed is:

1. A beam splitter assembly comprising:
a beam splitter;
a holder that holds the beam splitter; and
a first spacer arranged between the beam splitter and the holder,
wherein the first spacer faces a peripheral edge portion of the beam splitter, and supports the beam splitter at three points by three bent portions each configured by folding a part of the first spacer.

2. The beam splitter assembly as recited in claim 1, wherein, in the first spacer, a first folding assisting line indicating a bending position where a part of the first spacer is bent is formed so as to correspond to each of the three bent portions.

3. The beam splitter assembly as recited in claim 1, wherein the first spacer includes an annular first main body facing a peripheral edge portion of the beam splitter, and the three bent portions are formed at equal intervals in a circumferential direction with respect to a center of the first main body.

4. The beam splitter assembly as recited in claim 1, further comprising:
a compensating plate held by the holder; and
a second spacer arranged between the compensating plate and the holder,
wherein the second spacer faces a peripheral edge portion of the compensating plate, and the compensating plate is supported at an angle with respect to an optical axis by at least one bent portion configured by folding a part of the second spacer.

5. The beam splitter assembly as recited in claim 4, wherein, in the second spacer, a second folding assisting line indicating a bending position where a part of the second spacer is formed so as to correspond to the at least one bent portion.

6. The beam splitter assembly as recited in claim 4, wherein the second spacer includes an annular second main body facing a peripheral edge portion of the compensating plate, and the at least one bent portion is formed in a circumferential direction with respect to a center of the second main body.

* * * * *